United States Patent
Ma et al.

(10) Patent No.: US 7,102,967 B1
(45) Date of Patent: Sep. 5, 2006

(54) METHOD AND APPARATUS FOR TRACKING ERROR DETECTION IN OPTICAL DISK DRIVER

(75) Inventors: Byung-in Ma, Suwon (KR); In-sik Park, Suwon (KR); Joong-eon Seo, Uiwang (KR); Jae-seong Shim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 619 days.

(21) Appl. No.: 09/613,695

(22) Filed: Jul. 10, 2000

(30) Foreign Application Priority Data

Jul. 8, 1999 (KR) ............................. 1999-27451

(51) Int. Cl.
*G11B 7/00* (2006.01)
(52) U.S. Cl. .............................. 369/44.25; 369/44.34
(58) Field of Classification Search ............. 369/44.25, 369/44.26, 44.34, 44.35, 44.41
See application file for complete search history.

(56) References Cited

U.S. PATENT DOCUMENTS

| 5,511,063 | A | * | 4/1996 | Kawase ................... 369/275.3 |
| 5,631,891 | A | * | 5/1997 | Moritsugu et al. ...... 369/124.11 |
| 5,808,979 | A | | 9/1998 | Ishibashi et al. |
| 5,914,925 | A | | 6/1999 | Lee et al. |
| 5,978,322 | A | * | 11/1999 | Sugimoto et al. ........ 369/47.26 |
| 6,339,567 | B1 | * | 1/2002 | Shimamoto et al. ..... 369/44.35 |

FOREIGN PATENT DOCUMENTS

| JP | 62-73433 | 4/1987 |
| JP | 7-296395 | 11/1995 |
| JP | 9-161285 | 6/1997 |
| JP | 10-198981 | 7/1998 |
| JP | 10-208262 | 8/1998 |
| JP | 10-302277 | 11/1998 |
| KR | 1998-59924 | 10/1998 |

OTHER PUBLICATIONS

Electronic translation of JP 10-302277.*
Machine translation of Hachi (JP 07-296395).*
Office Action issued in Korean Patent Application No. 1999-27451 on Feb. 4, 2006.
U.S. Appl. No. 10/991,869, filed Nov. 19, 2004, Byung-in Ma, et al., Samsung Electronics, Co., Ltd.
U.S. Appl. No. 11/044,222, filed Jan. 28, 2005, Byung-in Ma, et al., Samsung Electronics, Co., Ltd.

* cited by examiner

*Primary Examiner*—Brian E. Miller
*Assistant Examiner*—Peter Vincent Agustin
(74) *Attorney, Agent, or Firm*—Stein, McEwen & Bui, LLP

(57) ABSTRACT

A method and apparatus for tracking error detection in an optical disk reproduction system. The tracking error detecting apparatus generates a tracking error signal as a difference signal of optical detection signals generated by more than two optical detectors positioned along a diagonal line from a track center and includes binarizers which binarize each output of the optical detectors, phase locked loops (PLLs) which generate respective clock signals synchronized with the outputs of each of the binarizers, a phase difference detector which detects a phase difference between the synchronized signals output from the PLLs, and low-pass filters which filter the output of the phase difference detector to output the result as the tracking error signal. The tracking error detecting apparatus generates a tracking error signal which is not dependent on the lengths of pits or marks recorded on an optical disk, enhancing the reliability of the tracking error signal.

8 Claims, 7 Drawing Sheets

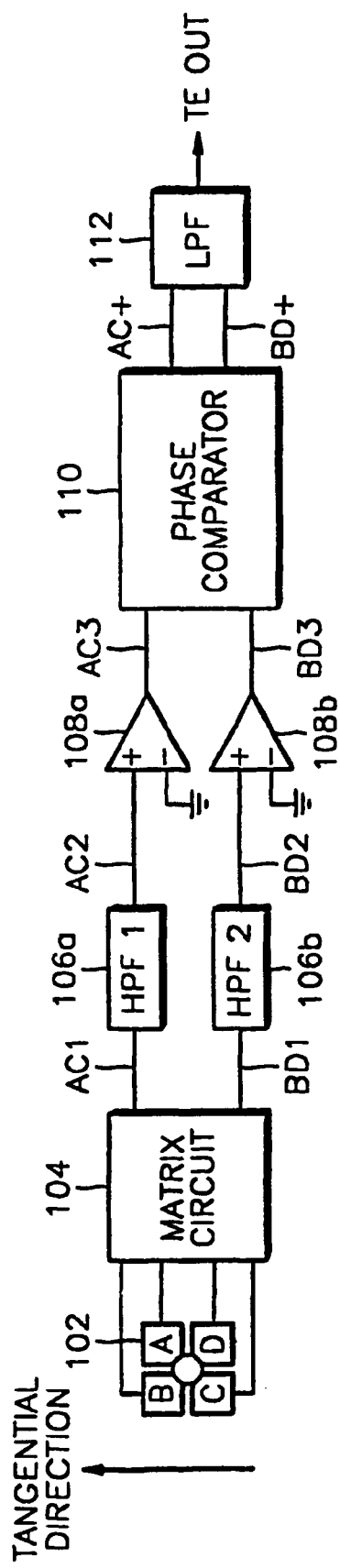
FIG. 1 (PRIOR ART)
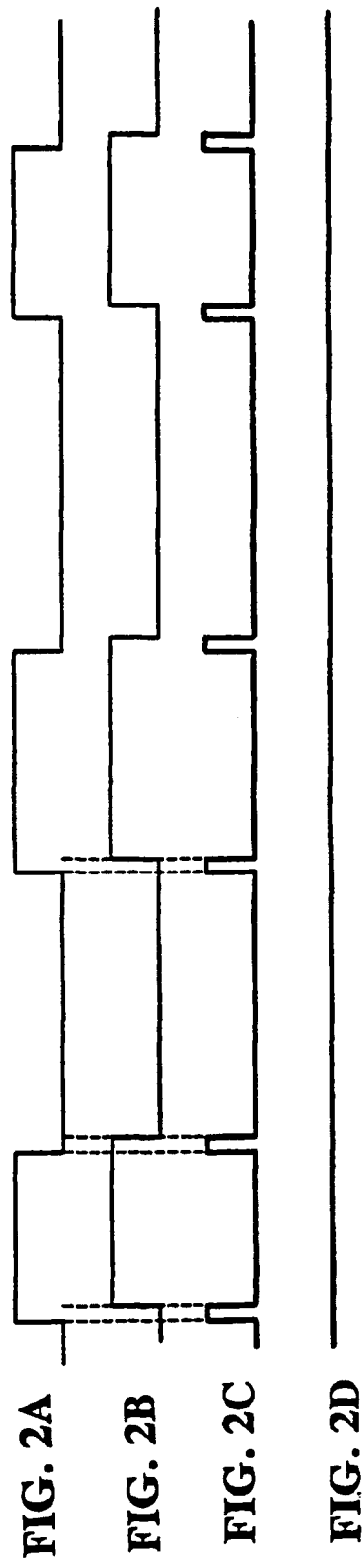
FIG. 2A
FIG. 2B
FIG. 2C
FIG. 2D
(PRIOR ART)

METHOD AND APPARATUS FOR TRACKING ERROR DETECTION IN OPTICAL DISK DRIVER

CROSS-REFERENCE TO RELATED APPLICATIONS

This application claims the benefit of Korean Application No. 99-27451, filed Jul. 8, 1999, in the Korean Patent Office, the disclosure of which is incorporated herein by reference.

BACKGROUND OF THE INVENTION

1. Field of the Invention

The present invention relates to a method and apparatus for tracking error detection and more particularly, to an improved method and apparatus for tracking error detection in which a phase locked loop (PLL) is introduced into a conventional differential phase detection tracking error (DPD TE) method to increase the accuracy of tracking error detection.

2. Description of the Related Art

In a conventional DPD TE method, phase differences are generated on the edges of pits or marks of an optical disk. The length of pits or marks recorded on an optical disk lies in various ranges. For example, in the case of digital versatile disk-ROM (DVD-ROM), a length ranges from 3T to 14T where T is the duration of a channel clock of the disk. If there are a lot of pits or marks having a short length, phase difference detection can be performed many times, thereby enhancing the reliability of a tracking error signal derived therefrom. Conversely, if there are more pits or marks having a long length, the number of times phase difference detection may be done is reduced, thereby degrading the reliability of a tracking error signal. Further, a spectrum component, according to a modulation method of signal recorded on a disk, is closely related to outputs of AC+ and BD+, and a low-frequency component of the spectrum acts on noise with regard to a tracking error signal which is used for following and determining the position of a tracking center.

According to a conventional DPD TE method, phase difference detection is supposed to be made from pits or marks at one time, so that the gain and characteristics of a detected signal deteriorate if the signal of pits or marks is adversely affected by defects or the like. In addition, as the track density of an optical disk increases, the magnitude and gain of a tracking error signal according to the conventional DPD TE method decrease. Thus, the conventional DPD TE method has a disadvantage in that it is difficult to precisely control tracking in a high-density track structure. Referring to FIG. 1, the configuration of a tracking error detecting apparatus according to a conventional differential phase detection tracking error (DPD TE) method is shown. The apparatus shown in FIG. 1 includes a four-section optical detection unit 102, a matrix circuit 104, high-pass filters (HPFs) 106a and 106b, comparators 108a and 108b, a phase comparator 110, and a low-pass filter (LPF) 112. The apparatus detects a phase difference between the signals output from the four-section optical detection unit 102 to determine the position of a laser spot. If the laser spot deviates from a track center, then a time delay or a phase difference between A+C and B+D signals results. Thus, a tracking error signal is generated by detecting the time delay between those signals.

Specifically, the matrix circuit 104 adds optical detection signals A and B, and C and D, which are positioned along a diagonal line among the outputs (A, B, C and D) of the four-section optical detection unit 102, and outputs AC1 and BD1 from A+C and B+D, respectively. The HPFs 106a and 106b reinforce the high-frequency components of AC1 and BD1 provided from the matrix circuit 104, differentiate AC1 and BD1, and output the results, i.e., AC2 and BD2 to the comparators 108a and 108b. The comparators 108a and 108b binarize each of AC2 and BD2 provided from the HPFs 106a and 106b, compare AC2 and BD2 with a predetermined level (a ground level in FIG. 1) to output the results, i.e., AC3 and BD3 to the phase comparator 110.

The phase comparator 110 detects a phase difference between AC3 and BD3 provided from the comparators 108a and 108b, compares the phases of AC3 and BD3 to output the results, i.e., AC+ and BD+ to the LPF 112. In this case, AC+ is a phase difference signal generated when AC3 leads BD3 in phase, while BD+ is a phase difference signal generated when BD3 leads AC3 in phase. The LPF 112 filters AC+ and BD+ input from the phase comparator 110 and outputs the result as a tracking error signal.

FIGS. 2A–2D are waveform diagrams illustrating operation of the apparatus shown in FIG. 1. FIGS. 2A–2D show the case in which AC3 leads BD3 in phase. The wave forms of AC3, BD3, AC+ and BD+ signals are illustrated sequentially from FIG. 2A to FIG. 2D. As shown in FIGS. 2A–2D, it can be found that if a laser spot deviates by a predetermined amount, there exists a phase difference between AC3 and BD3, shown in FIG. 2A and FIG. 2B, respectively, which is in turn reflected into AC+ and BD+, shown in FIG. 2C and FIG. 2D, respectively. If AC3 leads BD3 in phase, a tracking error signal is greater than a predetermined central value, but in the opposite case, it is less than the predetermined central value. The degree to which a tracking error signal deviates from the central value corresponds to the distance by which the laser spot is departed from the track center.

The phase comparator 110 of the apparatus shown in FIG. 1 detects a phase difference at a rising or falling edge of AC3 and BD3. The rising or falling edges of AC3 and BD3 correspond to the edges of pits or marks recorded on an optical disk. In other words, the apparatus shown in FIG. 1 detects a phase difference once on every edge of pits and marks recorded on an optical disk. Thus, as the number of pits or marks increases, the reliability of a tracking error signal increases, and as the number of pits or marks decreases, the reliability of the signal decreases. If pits or marks are affected by defects of an optical disk or other factors, the gain and characteristics of a tracking error signal become worse. A spectrum component according to a recording modulation method is closely connected with AC+ and BD+, and especially a low-frequency component of the spectrum works on noise with regard to a tracking error signal. Further, in the case of a tracking error signal according to the DPD TE method, the magnitude and gain are reduced as track density is increased, which makes the accurate control of tracking in a high track density structure difficult.

SUMMARY OF THE INVENTION

In order to improve such drawbacks, a tracking error detecting method according to the present invention involves generating clock signals, synchronized with each of the binarized signals AC3 and BD3, to detect a phase difference between those clock signals. In this case, all pulses in the synchronized clock signals have the phase difference components of AC+ and BD+, so that a tracking error signal can be generated regardless of the lengths of pits or marks recorded on a disk.

In the present invention, outputs of optical detectors which are disposed along a diagonal line from a track center are each binarized. Clock signals synchronized with each of the outputs obtained from the binarization are generated by Phase Locked Loop (PLL) circuits. When a laser spot deviates from a track center, the outputs AC3 and BD3 obtained from the binarization have a phase difference corresponding to the deviation degree of the laser spot with regard to the track center, and the clocks which are phase locked to the outputs have the same phase difference. A phase difference between the synchronized clock signals output in the phase locking is detected. All clocks in the synchronized clock signals have the phase difference components of AC+ and BD+, so that a phase difference component is detected on a clock-by-clock basis. The output from the phase difference detection is filtered by an LPF to obtain a tracking error signal.

It is an object of the present invention to provide a method of improving the accuracy of a tracking error detection with the introduction of a phase locked loop (PLL) into a conventional differential phase detection tracking error (DPD TE) method.

It is another object of the present invention to provide an apparatus using the above method.

Additional objects and advantages of the invention will be set forth in part in the description which follows, and, in part, will be obvious from the description, or may be learned by practice of the invention.

Accordingly, to achieve one object of the invention, there is provided a tracking error detecting method for producing a tracking error signal as a difference signal between optical detection signals generated from more than two optical detectors which are positioned along a diagonal line from a track center. The method according to the present invention includes binarizing the outputs of the optical detectors, phase-locking to generate clock signals synchronized with each of the outputs obtained from the binarization, detecting phase differences between the synchronized clock signals output from the phase-locking, and low-pass filtering the output of the phase difference detection, to output the tracking error signal.

In order to achieve another object, the present invention provides a first embodiment of a tracking error detection apparatus for producing a tracking error signal based on a difference signal of optical detection signals generated from more than two optical detectors which are positioned along a diagonal line from a track center. The first preferred embodiment of the apparatus according to the present invention includes binarizers which binarize each of the outputs of the optical detectors, PLLs which generate clock signals synchronized with each of the outputs of the binarizers, a phase difference detector which detects a phase difference between the synchronized clock signals output from the PLLs, and a low-pass filter which filters the output of the phase difference detector to output the result as the tracking error signal. In this case, it is preferable to further include a frequency divider for dividing the frequency of a channel clock signal by n (n=2,3,4 . . . ) to output the signal to the PLLs in the event that the phase of an output signal is inverted.

In order to achieve another object, the present invention also provides a second embodiment of a tracking error detecting apparatus for producing a tracking error signal based on a difference signal of optical detection signals generated from two optical detectors disposed at the outside of the track center of a three-section optical detection unit. The second preferred embodiment of the apparatus according to the present invention includes binarizers which binarize each of the outputs of the optical detectors, a phase difference detector which detects a phase difference between the outputs of the binarizers, and a low-pass filter which filters the output of the phase difference detector to output the result as a tracking error signal. In this case, it is preferable that the tracking error detecting apparatus further includes PLLs coupled to the binarizers and to the phase difference detector, in order to generate clock signals synchronized with each of the outputs of the binarizers and to output the synchronized clock signals to the phase difference detector.

BRIEF DESCRIPTION OF THE DRAWINGS

The above objectives and advantages of the present invention will become more apparent by describing in detail preferred embodiments thereof with reference to the attached drawings in which:

FIG. 1 is a block diagram of a tracking error detecting apparatus according to a conventional differential phase detection tracking error (DPD TE) method;

FIGS. 2A–2D are waveform diagrams showing the operation of the apparatus shown in FIG. 1;

DESCRIPTION OF THE PREFERRED EMBODIMENTS

Figure 3:
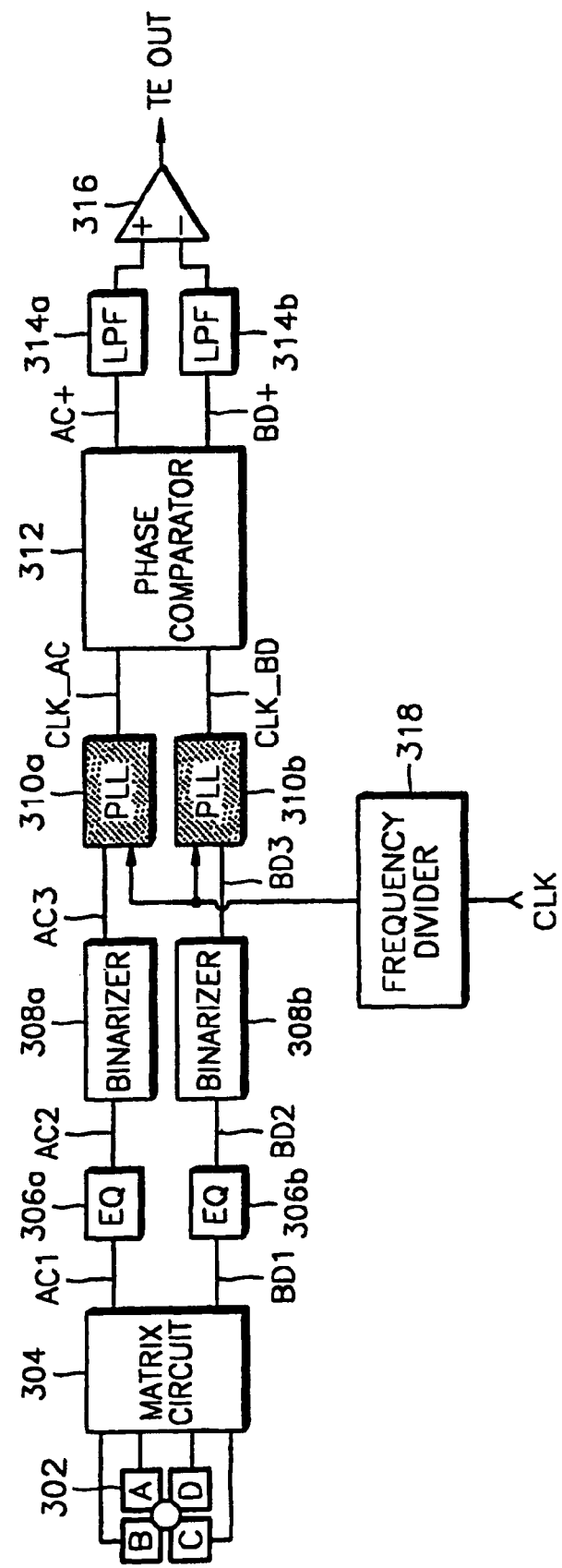
FIG. 3 is a block diagram of a first preferred embodiment of a tracking error detecting apparatus according to the present invention.
Figure 4:
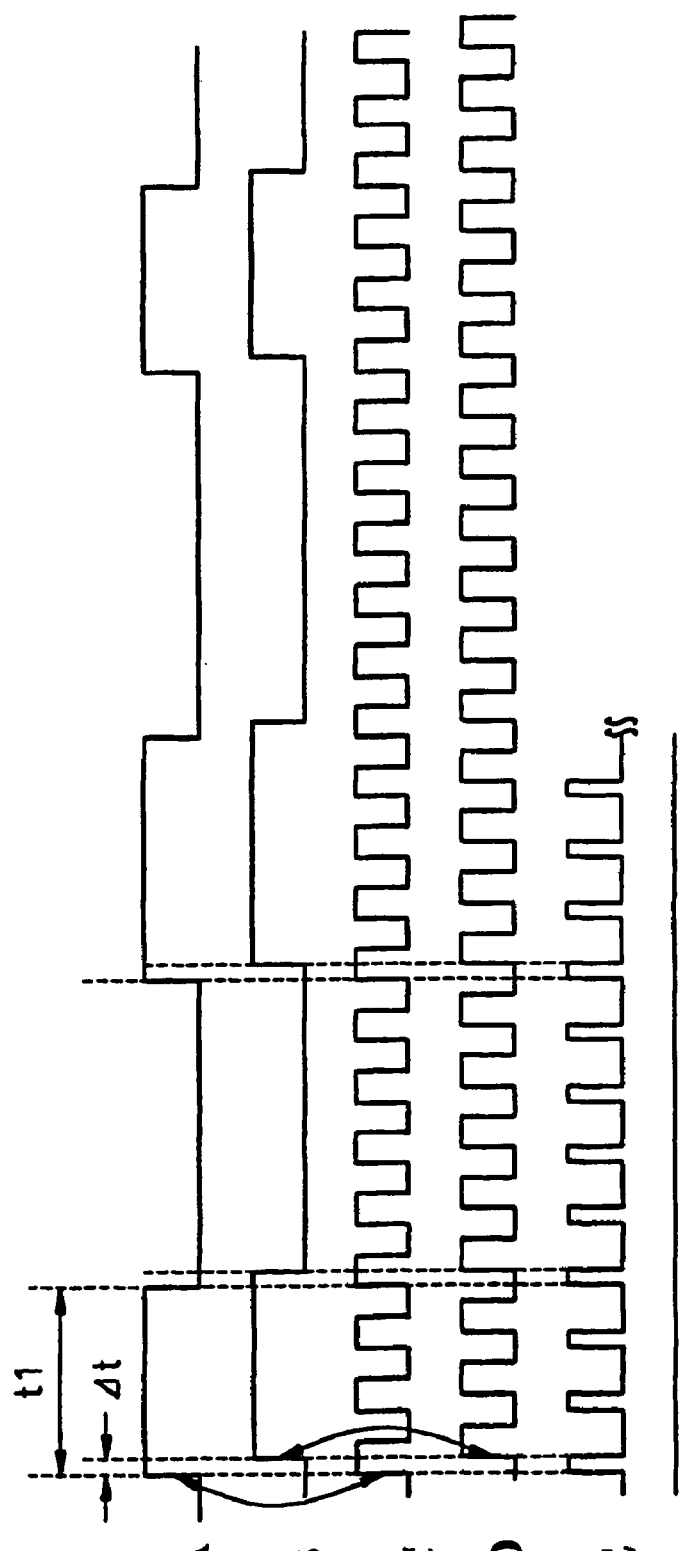
FIGS. 4A–4F are waveform diagrams showing the operation of the apparatus shown in FIG. 3.

Reference will now be made in detail to the present preferred embodiments of the present invention, examples of which are illustrated in the accompanying drawings, where like reference numerals refer to like elements throughout.

FIG. 3 is a block diagram showing a first preferred embodiment of a tracking error detecting apparatus according to the present invention. The apparatus shown in FIG. 3 includes a four-section optical detection unit 302, a matrix circuit 304, equalizers (EQs) 306a and 306b, binarizers 308a and 308b, PLLs 310a and 310b, a phase comparator 312, LPFs 314a and 314b, a differential amplifier 316, and a frequency divider 318.

The matrix circuit 304 adds optical detection signals A and C, and B and D among the outputs A, B, C and D of the four-section optical detection unit 302, and outputs AC1 and BD1 corresponding to A+C and B+D, respectively. That is, the matrix circuit 304 produces summation signals of the signals generated by optical detectors which are positioned along a diagonal line from a track center. The EQs 306a and 306b strengthen the high-frequency components of AC1 and BD1 provided from the matrix circuit 304 and remove noise therefrom, differentiate AC1 and BD1 and remove noise therefrom to output the results AC2 and BD2 to the binarizers 308a and 308b. In other words, since the outputs A, B, C and D of the four-section optical detection unit 302 have weak high-frequency components, the high-frequency components of AC 1 and BD 1 provided from the matrix circuit 304 are reinforced through the EQs 306a and 306b. Further, as the outputs A, B, C and D of the four-section optical detection unit 302 contain a noise component in addition to signals reflected from an optical disk, EQs 306a and 306b eliminate the noise component in AC1 and BD1 provided from the matrix circuit 304.

The binarizers 308a and 308b convert AC2 and BD2 provided from EQs 306a and 306b into binary digital signals and output the results AC3 and BD3 to the PLLs 310a and 310b. Binarizers 308a and 308b also perform binarization level compensation for AC2 and BD2 provided from the EQs 306a and 306b. The PLLs 310a and 310b accept the input signals CLK, AC3 and BD3 and output CLK_AC and CLK_BD, synchronized with AC3 and BD3, respectively, to the phase comparator 312. The phase comparator 312 detects a phase difference between CLK_AC and CLK_BD, and compares the phases of CLK_AC and CLK_BD to output the results AC+ and BD+ to LPFs 314a and 314b, respectively. In this case, AC+ and BD+ are phase difference signals generated when CLK_AC leads CLK_BD in phase and when CLK_BD leads CLK_AC in phase, respectively.

The LPFs 314a and 314b filter AC+ and BD+ provided from the phase comparator 312 to output the results to the differential amplifier 316. The differential amplifier 316 amplifies the difference signal of AC+ and BD+ filtered by the LPFs 314a and 314b to output the result as a tracking error signal (TE).

FIGS. 4A–4F are waveform diagrams showing the operation of the apparatus shown in FIG. 3. FIGS. 4A–4F show the case in which AC3 leads BD3 in phase, the wave forms of AC3, BD3, CLK_AC, CLK_BD, AC+, and BD+ signals are illustrated sequentially in FIGS. 4A–4F, respectively. As shown in FIGS. 4A–4F, it can be found that if a laser spot deviates from a track center by a predetermined amount, a phase difference existing between AC3 and BD3 is transferred to CLK_AC and CLK_BD, doubling by a CLK frequency. FIGS. 4A–4F indicate that CLK_AC and CLK_BD synchronized with AC3 and BD3 respectively are generated and a phase difference Δt created between AC3 and BD3 is transferred to the outputs CLK_AC and CLK_BD of the PLLs 310a and 310b. Thus, the phase difference value Δt is derived as a result of comparing the phases of CLK_AC and CLK_BD.

The conventional apparatus shown in FIG. 1 detects the phase difference Δt once in an interval tl as shown in FIGS. 2A–2D, while the apparatus according to the present invention can detect the phase difference Δt once every cycle of CLKs. When a channel clock is used as CLK, the phase difference Δt can be detected once every channel clock cycle T regardless of the lengths of pits or marks recorded on an optical disk. The frequency divider 318 frequency divides CLK at an interval where inversion of the output signal takes place, to output the result to the PLLs 310a and 310b. Inversion of the output signal occurs when the phase difference of a clock provided to the AC3 and the PLL 310 a or a clock provided to the BD3 and the PLL 310b is beyond a detection range of the PLL 310a and 310b. Divider 318 detects whether the output signal TE OUT has been inverted and performs a division operation when the output signal TE OUT is inverted as in the interval 93 of FIG. 9. Alternately, divider 318 detects the output signals of PLLs 310a and 310b to determine whether TE OUT has been inverted. In the apparatus of FIG. 3, a tracking servo control becomes unstable at the interval where inversion of the output signal happens. This is because inversion of the output signals causes deviation from the extent of phase difference detection by the PLLs 310a and 310b. Thus, in order to compensate for the deviation, the frequency of CLK is divided at the interval where inversion of the output signal occurs and the result is provided to the PLLs 310a and 310b.

Figure 5:
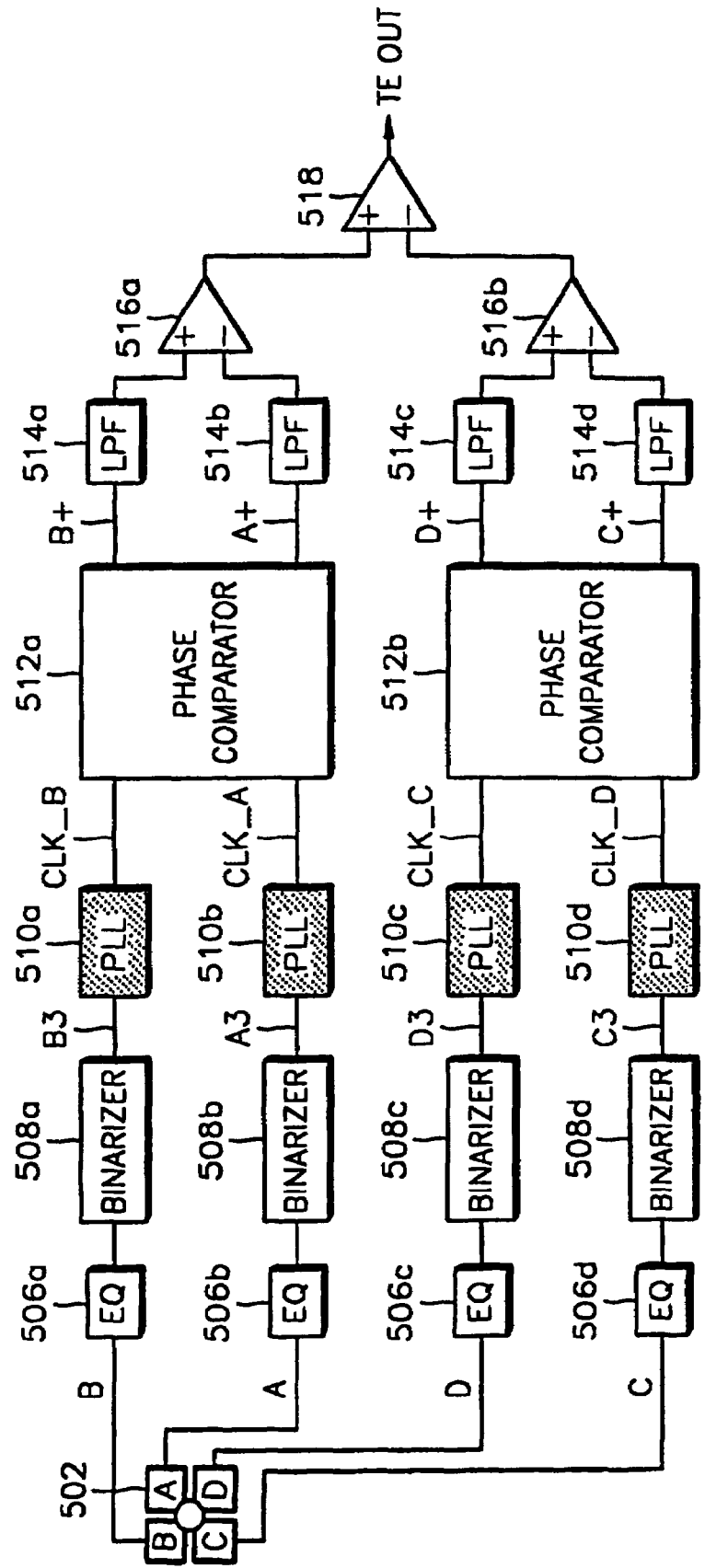
FIG. 5 is a block diagram of a second preferred embodiment of a tracking error detecting apparatus according to the present invention.

FIG. 5 is a block diagram showing a second embodiment of a tracking error detecting apparatus according to the present invention. The apparatus shown in FIG. 5 includes a four-section optical detection unit 502, EQs 506a–506d, binarizers 508a–508d, PLLs 510a–510d, phase comparators 512a and 512b, LPFs 514a–514d, differential amplifiers 516a and 516b, and an adder 518. Since outputs A, B, C and D of the four-section optical detection unit 502 have weak high-frequency components, a high-frequency component of A, B, C and D provided from the four-section optical detection unit 502 is reinforced through the EQs 506a–506d. Further, as the outputs A, B, C and D of the four-section optical detection unit 502 contain noise in addition to signals reflected from an optical disk, EQs 506a–506d eliminate the noise components of A, B, C and D provided from the four-section optical detection unit 502.

The binarizers 508a–508d convert signals provided from EQs 506a–506b into binary digital signals to output the results to the PLLs 510a–510d. The PLLs 510a–510d receive as input the signal CLK and the signals provided from the binarizers 508a–508d to output CLKs, CLK_A, CLK_B, CLK_C and CLK_D, synchronized with the signals provided from the binarizers 508a–508d to the phase comparators 512a and 512b. The phase comparators 512a and 512b detect phase differences between CLK_A and CLK_B and between CLK_C and CLK_D provided from the PLLs 510a–510d. The phase comparator 512a compares the phases of CLK_A and CLK_B to output the results A+ and B+ to the LPFs 514a and 514b, respectively, while the phase comparator 512b compares the phases of CLK_C and CLK_D to output the results C+ and D+ to the LPFs 514c and 514d, respectively. In this case, A+ and B+ are phase difference signals generated when CLK_A leads CLK_B in phase and when CLK_B leads CLK_A in phase, respectively. Further, C+ and D+ are phase difference signals generated when CLK_C leads CLK_D in phase and when CLK_D leads CLK_C in phase, respectively.

The LPFs 514a–514d filter A+, B+, C+ and D+ provided from the phase comparators 512a and 512b to output the results to the differential amplifiers 516a and 516b. The differential amplifiers 516a and 516b amplify the difference signals of A+ and B+, and C+ and D+ filtered by the LPFs 514a to 514d to output the results to the adder 518. The adder 518 adds the signals provided from the differential amplifiers 516a and 516b to output the result as TE.

Figure 6:
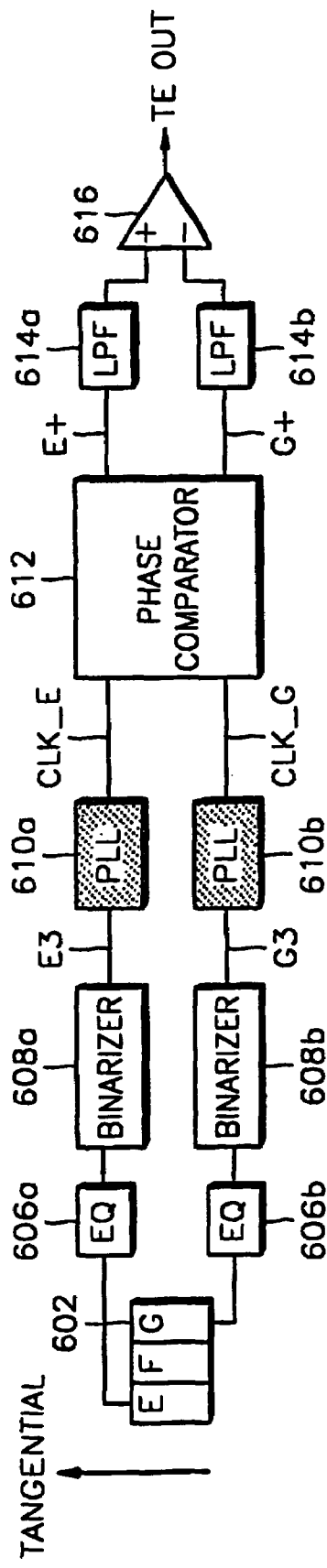
FIG. 6 is a block diagram of a third preferred embodiment of a tracking error detecting apparatus according to the present invention.

FIG. 6 is a block diagram showing a third preferred embodiment of a tracking error detecting apparatus according to the present invention, in which TE is produced using outputs of a three-section optical detection unit. The apparatus shown in FIG. 6 includes a three-section optical detection unit 602, EQs 606a and 606b, binarizers 608a and 608b, PLLs 610a and 610b, a phase comparator 612, LPFs 614a and 614b, and a differential amplifier 616.

The detection unit 602 has three optical detectors which are arranged transverse to a tangential direction of the recording track. The optical detectors generate electrical signals E, F and G corresponding to light reflected from the recording track. The EQs 606a and 606b strengthen the high-frequency components of signals E and G provided from optical detectors disposed at the outside of the three-section optical detection unit 602 and remove noise therefrom, differentiate E and G and remove noise therefrom to output the results to the binarizers 608a and 608b. The binarizers 608a and 608b convert the signals provided from EQs 606a and 606b into binary digital signals to output the results E3 and G3 to the PLLs 610a and 610b, respectively. The PLLs 610a and 610b receive as input CLK, E3 and G3 to output CLK_E and CLK_G synchronized with E3 and G3 to the phase comparator 612. The phase comparator 612 compares the phases of CLK_E and CLK_G and outputs the results E+ and G+ to the LPFs 614a and 614b, respectively. In this case, E+ and G+ are phase difference signals generated when CLK_E leads CLK_G in phase and when CLK_G leads CLK_E in phase, respectively.

The LPFs 614a and 614b filter E+ and G+ provided from the phase comparator 612 to output the results to the differential amplifier 616. The differential amplifier 616 amplifies the difference signal of E+ and G+ filtered by the LPFs 614a and 614b to output the result as TE.

Figure 7:
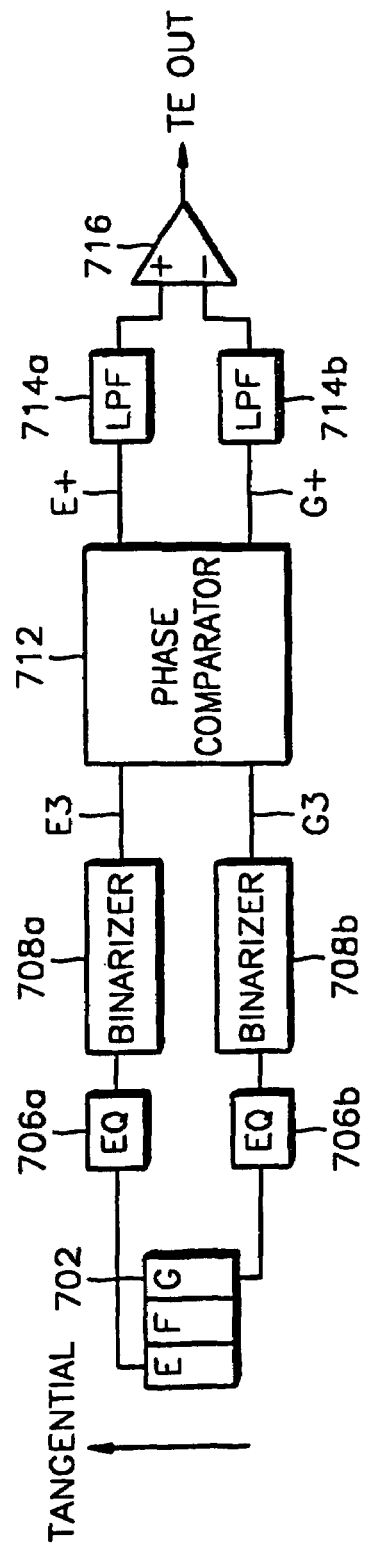
FIG. 7 is a block diagram of a fourth preferred embodiment of a tracking error detecting apparatus according to the present invention.

FIG. 7 is a block diagram showing a fourth preferred embodiment of a tracking error detecting apparatus according to the present invention in which TE is produced using the output of a three-section optical detection unit. The apparatus shown in FIG. 7 includes a three-section optical detection unit 702, EQs 706a and 706b, binarizers 708a and 708b, a phase comparator 712, LPFs 714a and 714b, and a differential amplifier 716.

The detection unit 702 has three optical detectors which are arranged transverse to a tangential direction of the recording track. The optical detectors generate electrical signals E, F and G corresponding to light reflected from the recording track. The EQs 706a and 706b differentiate E and G and remove noise therefrom to strengthen the high frequency component of signals E and G and output the results to the binarizers 708a and 708b. The binarizers 708a and 708b binarize the signals provided from EQs 706a and 706b into binary digital signals to output the results E3 and G3 to the phase comparator 712. The phase comparator 712 compares the phases of E3 and G3 to output the results E+ and G+ to the LPFs 714a and 714b, respectively. In this case, E+ and G+ are phase difference signals generated when E3 leads G3 in phase and when G3 leads E3 in phase, respectively.

The LPFs 714a and 714b filter E+ and G+ provided from the phase comparator 712 to output the results to the differential amplifier 716. The differential amplifier 716 amplifies the difference signal of E+ and G+ filtered by the LPFs 714a and 714b to output the result as TE.

Figure 8:
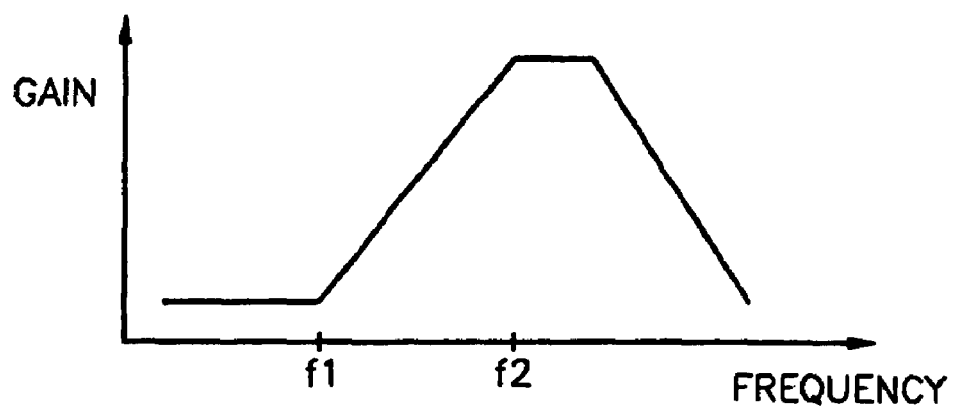
FIG. 8 is a graph of gain versus frequency for the equalizers shown in FIGS. 3 and 5–7.

FIG. 8 is a graph showing operation of the EQs of FIGS. 3 and 5–7, in which the vertical axis and the horizontal axis indicate gain and frequency, respectively. The EQs, having the properties as shown in FIG. 8, perform the function of controlling their properties so that an input signal can be positioned between a first frequency f1 and a second frequency f2 to amplify the high-frequency component which is close to the second frequency f2.

Figure 9:
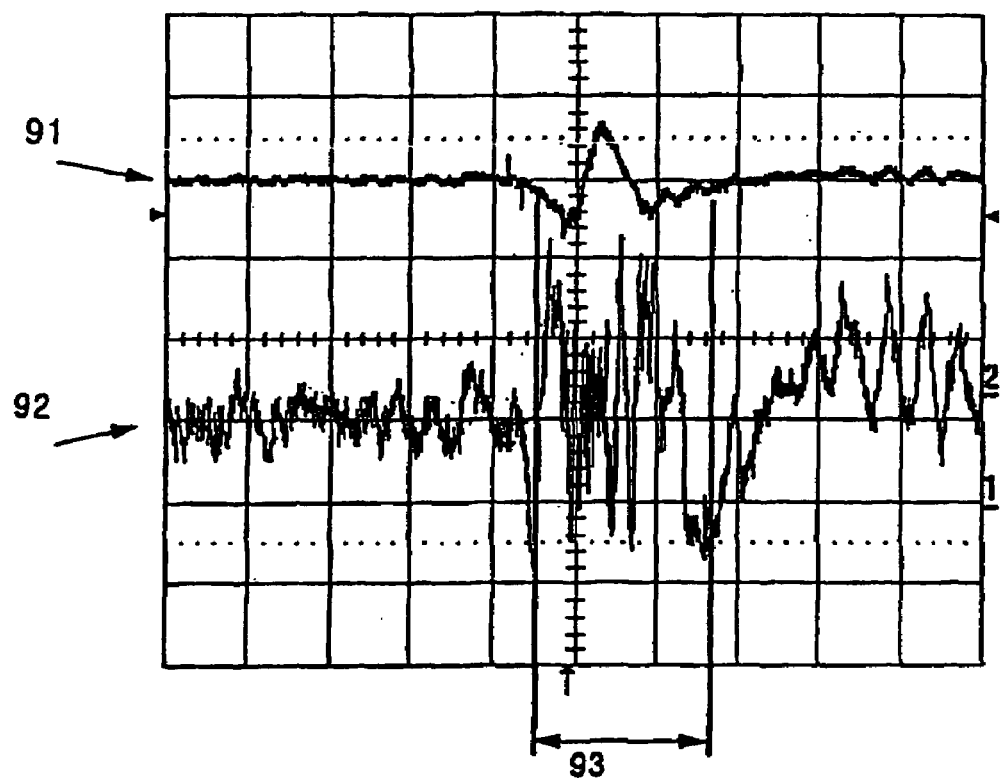
FIG. 9 is a graph showing the result of comparing a tracking error signal generated by a tracking error detecting apparatus according to the present invention, with a tracking signal generated by a conventional DPD TE method.

FIG. 9 is a graph showing the result of comparing a tracking error signal generated by a tracking error detecting apparatus according to the present invention with a tracking signal generated by a conventional DPD TE method. In FIG. 9, reference numerals 91 and 92 respectively represent tracking error signals generated by a conventional DPD TE method and a tracking error detecting apparatus according to the present invention, and it can be seen that the gain of the latter is greater than that of the former. Further, an interval 93 indicates the section where inversion of output signal occurs so that a phase difference will exceed the detection limit if the phase difference is detected using the CLKs generated from the PLLs as in the present invention. If this is the case, the frequency of the PLL CLK is divided by n (n=2,3,4, ... ) and the result is output to a phase difference detector, which increases the detection extent so that intervals such as 93 will not exist.

Figure 10:
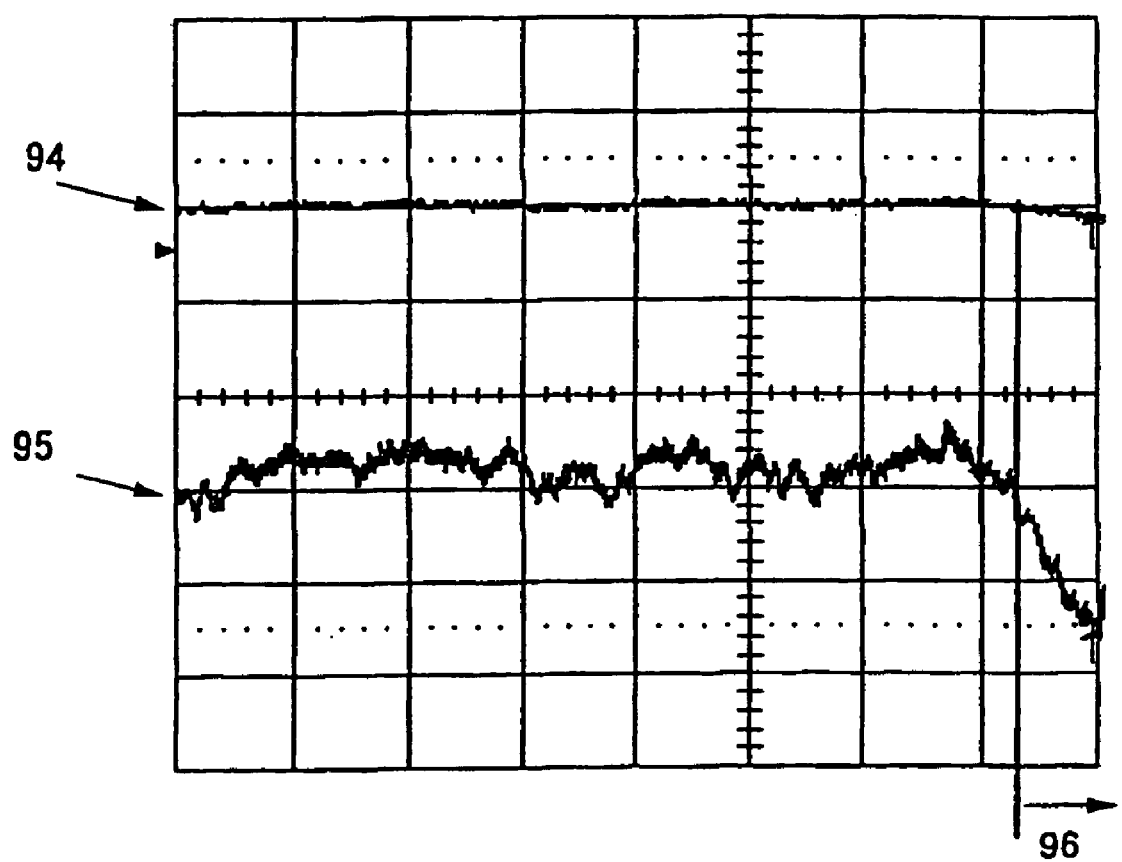
FIG. 10 is a graph showing the characteristic of gain of tracking error signals generated by a tracking error detecting apparatus according to the present invention and a conventional DPD TE method.

FIG. 10 is a graph showing the characteristic of gain of tracking error signals generated by a tracking error detecting apparatus according to the present invention and a conventional DPD TE method. In FIG. 10, reference numerals 94 and 95 respectively indicate the gains of tracking error signals generated by the conventional DPD TE method and the tracking error detecting apparatus according to the present invention. If both are measured under the same conditions, it can be seen that the gain of a tracking error signal generated in the apparatus according to the present invention is about 10 times greater than the gain of the other. An interval 96 is the section where an optical pickup jumps on an adjacent track in a normal tracking state. While the interval 96 cannot be shown clearly in a tracking error signal generated by the conventional DPD TE method, it is output as a large value in a tracking error signal generated by the present invention.

As described in the foregoing, a tracking error detecting apparatus according to the present invention is capable of generating a tracking error signal which does not vary depending on the lengths of pits and marks recorded on a optical disk, so that reliability of the tracking error signal can be enhanced.

Although a few preferred embodiments of the present invention have been shown and described, it would be appreciated by those skilled in the art that changes may be made in these embodiments without departing from the principles and spirit of the invention, the scope of which is defined in the appended claims and their equivalents.

What is claimed is:

1. An apparatus for providing a tracking error signal for an optical disk recording track, comprising:
    a plurality of optical detectors each of which generates an electrical signal,
    a matrix circuit which selects and adds said electrical signals in pairs to output at least one matrixed signal, each said pair corresponding to optical information detected along a line diagonal to the optical disk recording track;
    a circuit which binarizes each matrixed signal;
    a phase lock loop circuit receiving a first clock signal having a higher frequency than the matrixed signals and each matrixed signal, the phase lock loop circuit outputting second and third clock signals synchronized with the respective matrixed signals and having the same frequency as the first clock signal; and a phase detector which compares a phase of the second synchronized clock signal with a phase of the third synchronized clock signal to generate the tracking error signal, wherein the tracking error signal is independent of a length of pits and/or marks on the optical disk recording track.

2. The apparatus as claimed in claim 1, further comprising first and second equalizers which increase a high frequency component of respective ones of the matrixed signals prior to respectively binarizing the matrixed signals.

3. A tracking error detecting apparatus to produce a tracking error signal as a difference signal of optical detection signals generated by a plurality of optical detectors, the apparatus comprising:

a plurality of binarizers which binarize each of the optical detection signals;

a plurality of phase locked loops which generate clock signals synchronized with each of the outputs of the plurality of binarizers;

a phase difference detector which detects a phase difference between the generated clock signals output from the plurality of phase locked loops and generates phase difference signals; and low-pass filters which filter the phase difference signals output from the phase difference detector to output the result as the tracking error signal.

4. The tracking error detecting apparatus as claimed in claim 3, further comprising equalizers which reinforce high-frequency components of the optical detection signals and output the results to the binarizers.

5. The tracking error detecting apparatus as claimed in claim 3, wherein a clock signal provided to the phase locked loops is a channel clock signal.

6. A tracking error detecting apparatus for generating a tracking error signal, comprising:

an optical detection unit having a plurality of optical detectors to generate optical detection signals;

a matrix circuit arranged to select and add the optical detection signals in pairs, and generate summation signals based on the optical detection signals generated by the optical detectors which are positioned along a diagonal line from a track center of a recording track on an optical disk;

a binary circuit arranged to convert the summation signals into binary digital signals;

a phase lock loop (PLL) circuit driven by a predetermined channel clock to generate clock signals synchronized with each of the binary digital signals;

a phase-difference detector arranged to detect a phase difference of the synchronized clock signals and generate phase difference signals which are used to obtain a tracking error signal that is independent of a length of pits and/or marks recorded on the optical disk.

7. The tracking error detecting apparatus as claimed in claim 6, further comprising equalizers arranged to reinforce high frequency components of the summation signals prior to performing binarization.

8. The tracking error detecting apparatus as claimed in claim 6, wherein the phase difference between the synchronized clock signals is obtained every clock cycle of the predetermined channel clock regardless of the length of pits and/or marks recorded on the optical disk.

* * * * *